(12) United States Patent
Wu

(10) Patent No.: US 11,264,827 B2
(45) Date of Patent: Mar. 1, 2022

(54) CHARGING POWER SYSTEM WITH LOW STANDBY POWER CONSUMPTION AND METHOD OF CONTROLLING THE SAME

(71) Applicant: DELTA ELECTRONICS, INC., Taoyuan (TW)

(72) Inventor: Tsung-Yuan Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 366 days.

(21) Appl. No.: 16/023,843

(22) Filed: Jun. 29, 2018

(65) Prior Publication Data
US 2019/0207415 A1 Jul. 4, 2019

(30) Foreign Application Priority Data

Dec. 28, 2017 (TW) .................................. 106146134

(51) Int. Cl.
*H02J 7/00* (2006.01)
*H02J 9/00* (2006.01)
(Continued)

(52) U.S. Cl.
CPC .............. *H02J 9/005* (2013.01); *B60L 53/22* (2019.02); *H02J 1/102* (2013.01); *H02J 7/00* (2013.01); *H02J 7/022* (2013.01); *H02M 7/23* (2013.01)

(58) Field of Classification Search
CPC .. H02J 7/00; H02J 7/022; H02J 1/102; H02M 7/23; Y02T 90/10; Y02T 90/12;
(Continued)

(56) References Cited

U.S. PATENT DOCUMENTS 3,617,857 A * 11/1971 Gunderson ............... H02J 7/24
322/28
2004/0130292 A1* 7/2004 Buchanan ............... B60L 55/00
320/116
(Continued)

FOREIGN PATENT DOCUMENTS

EP 2912749 A2 9/2015
EP 2912749 B1 12/2017
WO WO-2017193168 A1 * 11/2017 ........ A61M 16/0003

OTHER PUBLICATIONS

Search Report issued in corresponding European patent application No. EP18180396.6 dated Aug. 13, 2018.

*Primary Examiner* — Richard Isla
*Assistant Examiner* — Michael N Dibenedetto
(74) *Attorney, Agent, or Firm* — Muncy, Geissler, Olds & Lowe, P.C.

(57) ABSTRACT

A charging power system with low standby power consumption includes a system control unit and a plurality of charging modules. The charging modules are electrically connected in parallel and receive an input power source. Each charging module includes an auxiliary power supply unit, a power conversion unit, and a charging module control unit. When the charging modules enter standby conditions, the system control unit produces auxiliary control signals and the charging module control units produce main control signals to correspondingly control the auxiliary power supply units to stop outputting auxiliary power. Accordingly, it is to reduce standby power consumption and increase overall efficiency of the charging power system.

18 Claims, 6 Drawing Sheets

(51) Int. Cl.
  *H02J 7/02* (2016.01)
  *H02J 1/10* (2006.01)
  *B60L 53/22* (2019.01)
  *H02M 7/23* (2006.01)

(58) Field of Classification Search
  CPC ... Y02T 90/121; Y02T 90/122; Y02T 90/127; Y02T 90/128
  USPC .......................................................... 320/107
  See application file for complete search history.

(56) References Cited

U.S. PATENT DOCUMENTS

| | | | |
|---|---|---|---|
| 2012/0181991 A1* | 7/2012 | Gofman | H02J 7/007 320/150 |
| 2016/0011650 A1* | 1/2016 | Yang | G06F 1/3206 713/323 |
| 2017/0099047 A1 | 4/2017 | Hsiao et al. | |
| 2019/0117919 A1* | 4/2019 | Panarello | A61M 16/0003 |

\* cited by examiner

CHARGING POWER SYSTEM WITH LOW STANDBY POWER CONSUMPTION AND METHOD OF CONTROLLING THE SAME

BACKGROUND

Technical Field

The present disclosure relates to a charging power system and a method of controlling the same, and more particularly to a charging power system with low standby power consumption and a method of controlling the same.

Description of Related Art

The statements in this section merely provide background information related to the present disclosure and do not necessarily constitute prior art.

In recent years, with the rise of awareness of energy conservation and the promotion of green energy policies by the government and private industry, the related technologies of electric vehicles (EVs) and charging stations have gradually received attention and development. In response to the increasing popularity of electric vehicles, the demand for charging stations of electric vehicles has also increased. Therefore, the demand and dependence of grid power have also increased.

Different from the long-term continuous operation of the general power system, the charging station of electric vehicles provides an intermittent power supply. Since the charging time of the exhausted electric vehicle is uncertain, the charging time of the charging station of electric vehicles is significantly different between peak and off-peak times. For example, the usage rate of charging electric vehicles may be lower in the initial stage of construction of the charging station and/or during night time (especially midnight time). Therefore, how to reduce the standby power consumption of the charging station during the unavailable time, such the initial stage of construction of the charging station and/or during night time (especially midnight time) to reduce energy consumption, save operation costs, and reduce the burden of the power grid is the most important thing.

Please refer to FIG. 1, which shows a block circuit diagram of a related art power conversion system. The power conversion system is used for charging electric vehicles to reduce standby power consumption. The power conversion system includes a main power conversion part and a system control part. The main power conversion part includes at least one power conversion module Mpc1-Mpcn which is connected in parallel to each other. The system control part is implemented by a main control unit Ctr to control the power conversion system. In order to reduce the standby power consumption of the power conversion system, the power conversion system further includes a main switch Sws. The main switch Sws is electrically connected between the at least one power conversion module Mpc1-Mpcn and an input power source Vin. When the main control unit Ctr detects that the power conversion system is in standby condition, namely no electric vehicle is charged according to an output power source Vout, such as an output voltage or an output current, the main control unit Ctr outputs a switch control signal Scw to turn off the main switch Sws.

For 50-kW, 150-kW, or 300-kW charging station of electric vehicles, however, its input current is quite considerable, typically up to several hundred amperes. Therefore, the usage of the main switch Sws for controlling connection or disconnection of the main power path increases power consumption of charging operation as well as to increase system costs.

Moreover, all the at least one power conversion module Mpc1-Mpcn is simultaneously powered on or powered off by controlling the main switch Sws to be disadvantageous to the flexible application of power conversion system. Also, all the at least one power conversion module Mpc1-Mpcn is simultaneously powered on at the non-rated output current operation, thereby significantly reducing overall operation efficiency of the power conversion system.

SUMMARY

An objective of the present disclosure is to provide a charging power system with low standby power consumption to solve problems of failing to reduce standby power consumption and flexibly control the charging power system.

In order to achieve the above-mentioned objective, the charging power system with low standby power consumption includes a system control unit and a plurality of charging modules. The system control unit produces at least one auxiliary power control signal. The charging modules are connected in parallel to each other, and receive an input power source. Each charging module includes an auxiliary power supply unit, a power conversion unit, and a charging module control unit. The auxiliary power supply unit is connected to the input power source through an auxiliary power path, and produces an auxiliary power. The power conversion unit is connected to the input power source through a main power path, and receives the auxiliary power. The charging module control unit is connected to the auxiliary power supply unit, and receives the auxiliary power and produces a main power control signal. When the charging module enters a standby condition, the main power control signal and the auxiliary power control signal stop outputting the auxiliary power.

In one or more than one embodiment, the main power path provides a main path switch, and the auxiliary power path provides an auxiliary path switch. The auxiliary path switch receives the auxiliary power control signal to make the auxiliary power supply unit output the auxiliary power; the main path switch receives the main power control signal to make the power conversion unit convert the input power source into an output power source.

In one or more than one embodiment, when the charging module enters the standby condition, the auxiliary power control signal turns off the auxiliary path switch to disconnect the auxiliary power path, and the main power control signal turns off the main path switch to disconnect the main power path so that the auxiliary power supply unit stops outputting the auxiliary power.

In one or more than one embodiment, each auxiliary power supply unit further includes an integrated circuit. The integrated circuit receives the auxiliary power control signal to control the auxiliary power supply unit to output the auxiliary power by the auxiliary power control signal. The main power path provides a main path switch, and the main path switch receives the main power control signal to make the power conversion unit convert the input power source into an output power source.

In one or more than one embodiment, when the charging module enters the standby condition, the auxiliary power control signal disables the integrated circuit, and the main power control signal turns off the main path switch to disconnect the main power path so that the auxiliary power supply unit stops outputting the auxiliary power.

In one or more than one embodiment, the auxiliary power path further provides a current-limiting resistor, and the current-limiting resistor is connected in series to the auxiliary path switch.

In one or more than one embodiment, the main path switches and the auxiliary path switches are relays or semiconductor power switches.

Accordingly, the charging power system with low standby power consumption is provided to reduce standby power consumption, increase overall operation efficiency of the charging power system, and flexibly control the charging power system.

Another objective of the present disclosure is to provide a method of controlling a charging power system with low standby power consumption to solve problems of failing to reduce standby power consumption and flexibly control the charging power system.

In order to achieve the above-mentioned objective, the method of controlling the charging power system with low standby power consumption is provided. The charging power system includes a plurality of charging modules, and each charging module includes a power conversion unit, an auxiliary power supply unit, and a charging module control unit. The method includes steps of: (a) receiving an input power source by each charging module; (b) turning on an auxiliary power path of each charging module to make the auxiliary power supply unit generate an auxiliary power to supply power to the charging module control unit and the power conversion unit; (c) turning on a main power path of each charging module to make the power conversion unit convert the input power source into an output power source; and (d) controlling the auxiliary power supply unit to stop outputting the auxiliary power when the charging module enters a standby condition.

In one or more than one embodiment, the main power path provides a main path switch, and the auxiliary power path provides an auxiliary path switch. The auxiliary path switch receives an auxiliary power control signal to make the auxiliary power supply unit output the auxiliary power; the main path switch receives a main power control signal to make the power conversion unit convert the input power source into the output power source.

In one or more than one embodiment, when the charging module enters the standby condition, the auxiliary power control signal turns off the auxiliary path switch to disconnect the auxiliary power path, and the main power control signal turns off the main path switch to disconnect the main power path so that the auxiliary power supply unit stops outputting the auxiliary power.

In one or more than one embodiment, each auxiliary power supply unit further includes an integrated circuit. The integrated circuit receives an auxiliary power control signal to control the auxiliary power supply unit to output the auxiliary power by the auxiliary power control signal. The main power path provides a main path switch, and the main path switch receives the main power control signal to make the power conversion unit convert the input power source into an output power source.

In one or more than one embodiment, when the charging module enters the standby condition, the auxiliary power control signal disables the integrated circuit, and the main power control signal turns off the main path switch to disconnect the main power path so that the auxiliary power supply unit stops outputting the auxiliary power.

In one or more than one embodiment, the auxiliary power path further provides a current-limiting resistor, and the current-limiting resistor is connected in series to the auxiliary path switch.

In one or more than one embodiment, the main path switches and the auxiliary path switches are relays or semiconductor power switches.

In one or more than one embodiment, the charging power system further includes a system control unit. The system control unit produces the auxiliary power control signal, and the charging module control unit produces the main power control signal.

Accordingly, the method of controlling the charging power system with low standby power consumption is provided to reduce standby power consumption, increase overall operation efficiency of the charging power system, and flexibly control the charging power system.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
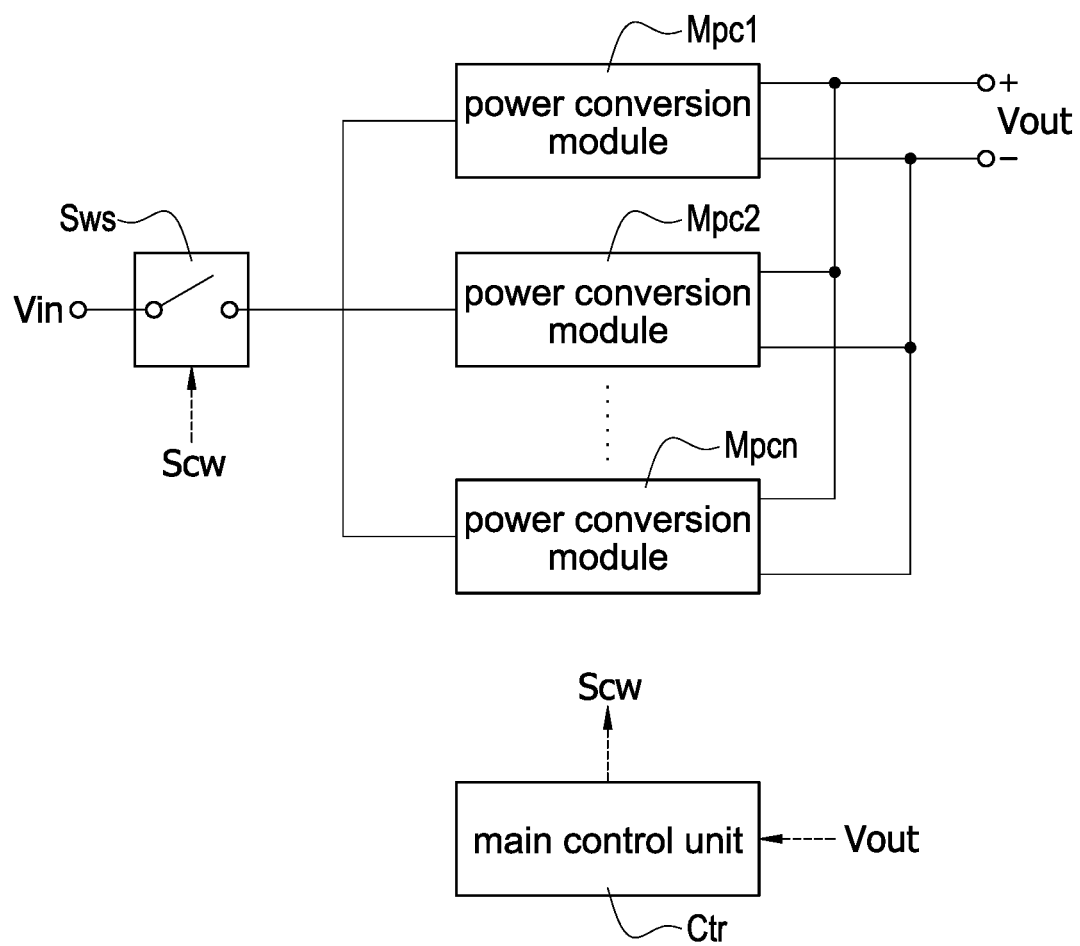
FIG. 1 is a block circuit diagram of a related art power conversion system.

Reference will now be made to the drawing figures to describe the present disclosure in detail. It will be understood that the drawing figures and exemplified embodiments of present disclosure are not limited to the details thereof.

Figure 2:
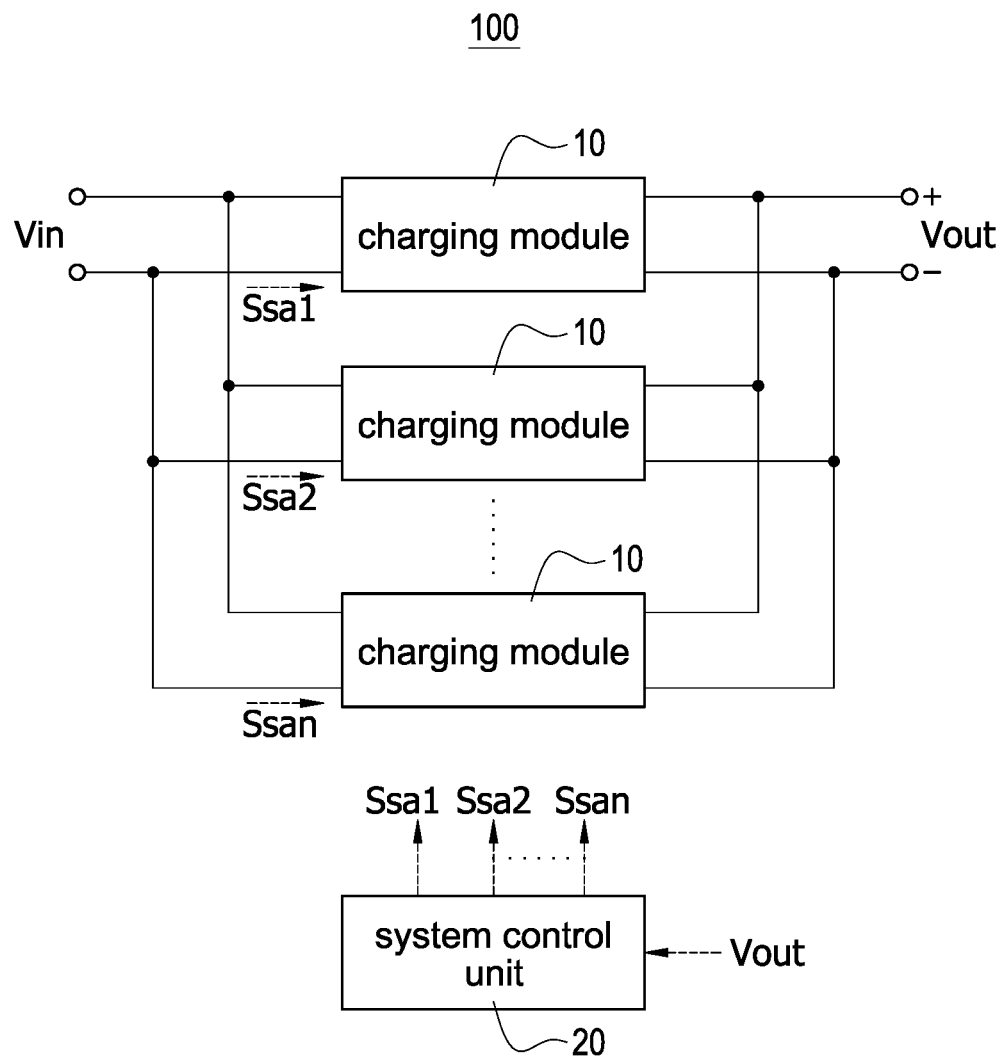
FIG. 2 is a block diagram of a charging power system with low standby power consumption according to the present disclosure.

Please refer to FIG. 2, which shows a block diagram of a charging power system with low standby power consumption according to the present disclosure. In order to solve the problems of increased system costs and increased power consumption since the main switch Sws (shown in FIG. 1) is additionally used for turning on and turning off the main power supplying path, a charging power system with low standby power consumption (hereinafter referred to as "charging power system") without using an upstream main switch or an externally-connected switch, namely the main switch Sws shown in FIG. 1 is proposed to reduce system costs of the charging power system and increase overall operation efficiency of the charging power system.

In one embodiment, the charging power system 100 shown in FIG. 2 may be a charging station for charging electric vehicles. The charging power system 100 includes a plurality of charging modules 10 and a system control unit 20. The charging modules 10 are connected in parallel to each other, and an input side of each charging module 10 directly receives an input power source Vin. The input power source Vin may be a DC input power source or an AC input power source. The system control unit 20 is correspondingly coupled to each of the charging modules 10, and the system control unit 20 may produce a single auxiliary power control signal to synchronously control each of the charging modules 10, or may produce a plurality of auxiliary power control signals Ssa1-Ssan to respectively and correspondingly control the charging modules 10 (as shown in FIG. 2) so as to control the auxiliary power inside the charging module 10, for example to disconnect supplying power when the charging module 10 enters a standby condition, and to wake up the charging module 10 when the charging module 10 is in the standby condition. The detailed descriptions will be made hereinafter with reference to figures.

Figure 3:
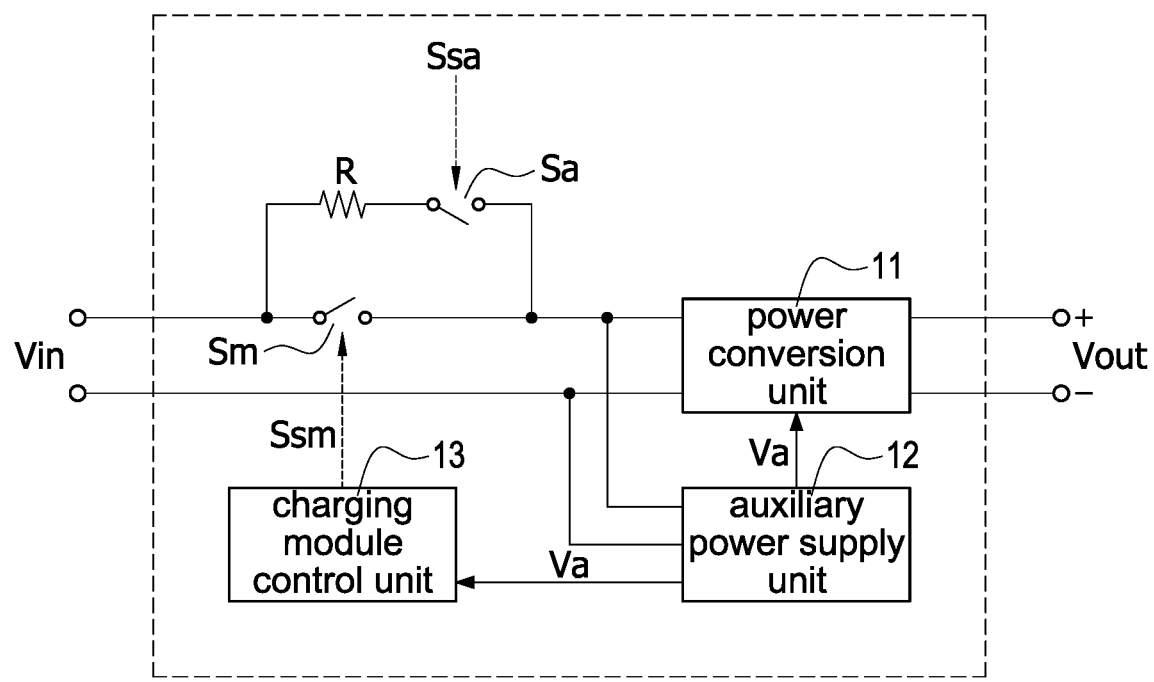
FIG. 3 is a block circuit diagram of a charging module according to a first embodiment of the present disclosure.

Please refer to FIG. 3, which shows a block circuit diagram of a charging module according to a first embodiment of the present disclosure. The charging module 10 includes a main power path, a power conversion unit 11, an auxiliary power path, an auxiliary power supply unit 12, and a charging module control unit 13. The main power path is connected to the input power source Vin, and the power conversion unit 11 is connected to the input power source Vin through the main power path, that is, the main power path provides a path between the input power source Vin and the power conversion unit 11.

In one embodiment, the power conversion unit 11 may be an AC-to-DC converter, which includes a transformer, switch components, and active and passive electrical components, for converting the AC input power source Vin into the DC output power source Vout. In another embodiment, the power conversion unit 11 may be a DC-to-DC converter, which includes a transformer, switch components, and active and passive electrical components, for converting the DC input power source Vin into the DC output power source Vout.

The auxiliary power supply unit 12, such as a flyback converter is used to provide an auxiliary power Va, such as 12-volt, 5-volt, or 3.3-volt DC voltage for supplying the required power to electrical components inside the charging module 10. For example, the auxiliary power Va outputted from the auxiliary power supply unit 12 supplies the required power to the power conversion unit 11 and the charging module control unit 13, or other circuits inside the charging modules 10, such as the energy conversion circuit, feedback circuit, communication circuit, measurement circuit, or so on.

The auxiliary power path is connected to the input power source Vin, and the auxiliary power supply unit 12 is connected to the input power source Vin through the auxiliary power path, that is, the auxiliary power path, that is, the auxiliary power path provides a path between the input power source Vin and the auxiliary power supply unit 12.

Different from the system control unit 20 shown in FIG. 2 is used as the control of the charging power system, the charging module control unit 13 is disposed inside the charging modules 10, and the charging module control unit 13 is connected to the auxiliary power supply unit 12 to provide a main power control signal Ssm.

More specifically, the auxiliary power control signals Ssa1-Ssan provided from the system control unit 20 correspondingly control to turn on (connect) or turn off (disconnect) the auxiliary power paths. As shown in FIG. 3, the auxiliary power control signal Ssa is provided from the system control unit 20 and is received by the charging modules 10 to turn on (connect) or turn off (disconnect) the auxiliary power path of the charging module 10. For the charging modules 10, the auxiliary power control signal Ssa provided from the system control unit 20 is an external control signal to control an auxiliary path switch Sa disposed inside the charging modules 10, the detailed description will be made hereinafter. In addition, each charging module control unit 13 provides the main power control signal Ssm to turn on (connect) or turn off (disconnect) the main power path of the charging module 10 by controlling a main path switch Sm disposed inside the charging modules 10.

In the embodiment shown in FIG. 3, the main power path provides the main path switch Sm and the auxiliary power path provides the auxiliary path switch Sa. The main path switch Sm and auxiliary path switch Sa may be, for example but not limited to, relays such as normal-open relays. In this embodiment, each relay of the charging module 10 can be individually and separately controlled to provide a switch function by controlling excitation coils of the relay of the charging module 10 by the auxiliary power control signals Ssa1-Ssan and the main power control signal Ssm.

The auxiliary power path further provides a current-limiting resistor R with a high resistance, also called a bypass resistor. Also, the current-limiting resistor R is connected in series to the auxiliary path switch Sa to suppress the inrush current flowing through the auxiliary path switch Sa when the auxiliary path switch Sa is instantaneously turned on. Since the inrush current is the large instantaneous current drawn by an electrical device at a moment in time, the inrush current suppressed by the current-limiting resistor R makes the relay, namely the auxiliary path switch Sa with smaller current capacity be used to withstand electrical stress. In other embodiments, the main path switch Sm and the auxiliary path switch Sa are not limited to the relays, but semiconductor power switches, such as TRIACs (triode AC semiconductor switches) having sufficient ability of withstanding voltage and/or current stresses can be also used as the main path switch Sm and the auxiliary path switch Sa.

Figure 4:
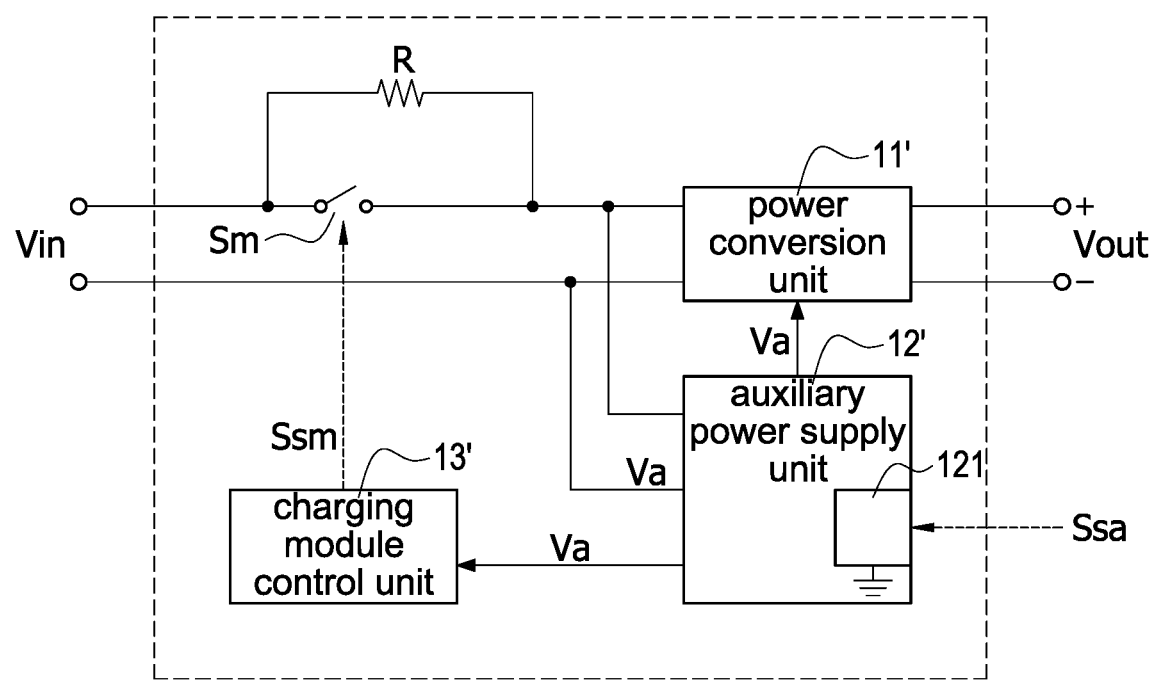
FIG. 4 is a block circuit diagram of the charging module according to a second embodiment of the present disclosure.

Please refer to FIG. 4, which shows a block circuit diagram of the charging module according to a second embodiment of the present disclosure. The major difference between the second embodiment shown in FIG. 4 and the first embodiment shown in FIG. 3 is that an auxiliary power supply unit 12' is used instead of the auxiliary power supply unit 12 to control turning on or turning off the auxiliary power path in the former. More specifically, the integrated circuit 121 which is part of the auxiliary power supply unit 12' receives the auxiliary power control signal Ssa, and the integrated circuit 121 is controlled by the auxiliary power control signal Ssa outputted from the system control unit 20. Although the auxiliary power control signal Ssa seems to be directly received by the integrated circuit 121, a photo coupler may be connected to the integrated circuit 121, and receive the auxiliary power control signal Ssa and convert the auxiliary power control signal Ssa into a drive signal for driving and controlling the integrated circuit 121 in practical circuit applications. For example, the photo coupler receives the auxiliary power control signal Ssa, which is used to turn off (disconnect) the auxiliary power path, and converts the received auxiliary power control signal Ssa into a disable drive signal to control the auxiliary power supply unit 12' to stop outputting the auxiliary power, thereby reducing power consumption caused by the auxiliary power.

Hereinafter, the operation and control of each charging module 10 shown in FIG. 3 and FIG. 4 will be described in detail. Please refer to FIG. 5, which shows a schematic timing diagram of controlling the charging module according to the first embodiment (corresponding to FIG. 3) of the present disclosure, and schematic waveforms of the input power source Vin, the auxiliary power control signal Ssa, the auxiliary power Va, and the main power control signal Ssm are shown from top to bottom, respectively. For convenience and clarity of explanation, only one charging module 10 is exemplified for demonstration below. At a first time point t1, the charging modules 10 receives the input power source Vin so that the input power source Vin supplies power to each charging modules 10. At a second time point t2, the auxiliary power control signal Ssa is changed from a low level to a high level to turn on (connect) the auxiliary power path. However, it is within the scope of the present disclosure to not limit the above-mentioned manner of signal transition for turning on and/or turning off the auxiliary power path as long as it can achieve controlling the auxiliary power path.

Corresponding to the first embodiment shown in FIG. 3, the auxiliary power control signal Ssa is one of the auxiliary power control signals Ssa1-Ssan. The auxiliary power control signal Ssa is changed from the low level to the high level to turn on the auxiliary path switch Sa and to connect the auxiliary power path, and therefore the auxiliary power supply unit 12 is supplied power to establish (provide) the auxiliary power Va. Therefore, at a third time point t3, the integrated circuit 121 outputs the auxiliary power Va to supply the required power to the power conversion unit 11 and the charging module control unit 13, or other circuits inside the charging modules 10, such as the energy conversion circuit, feedback circuit, communication circuit, measurement circuit, or so on.

Figure 5:
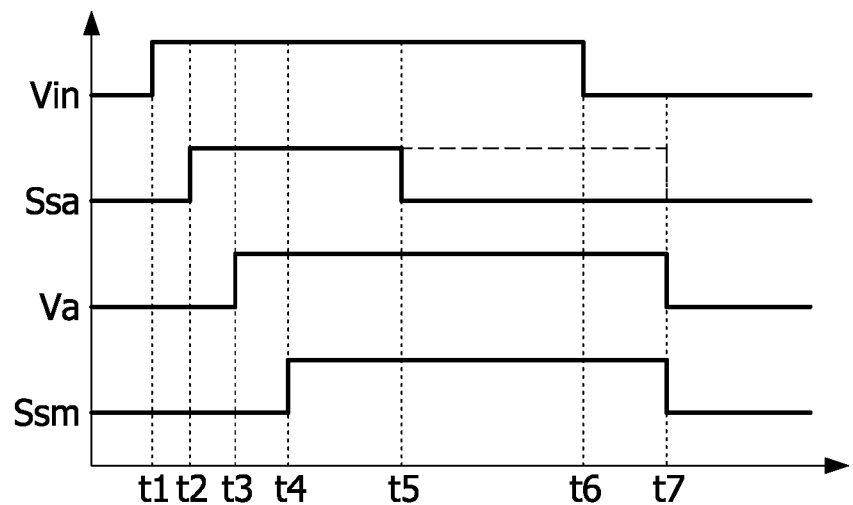
FIG. 5 is a schematic timing diagram of controlling the charging module according to the first embodiment of the present disclosure.

When the establishment of the auxiliary power Va is completed at a third time point t3, the charging module control unit 13 can produce the main power control signal Ssm since the charging module control unit 13 is supplied power by the auxiliary power Va. At this condition, the charging module control unit 13 can immediately output the main power control signal Ssm at the third time point t3 (when the auxiliary power Va is established) or the charging module control unit 13 can output the main power control signal Ssm at a fourth time point t4 as shown in FIG. 5. More specifically, after the charging module control unit 13 is supplied power by the auxiliary power Va, the charging module 10 is detected to determine whether the main power path should be turned on. After ensuring that the charging module 10 can be normally operated, the main power control signal Ssm is outputted form the charging module control unit 13 at the fourth time point t4 to turn on (connect) the main power path, and the input power source Vin is provided to the power conversion unit 11 so that the power conversion unit 11 converts the input power source Vin into the output power source Vout to provide the required charging power, such as charging current to charge the electric vehicles.

Due to the connection of the main power path, the input power source Vin can supply power to the auxiliary power supply unit 12 through the main power path to maintain that the auxiliary power supply unit 12 is supplied power. At this condition, the auxiliary power supply unit 12 may not need to be supplied power through the auxiliary power path, and therefore the auxiliary power path can be turned off (disconnected). As shown in FIG. 5, the auxiliary power control signal Ssa produced from the system control unit 20 (shown in FIG. 2) is changed from the high level to the low level at a fifth time point t5 (as shown by a solid line) to externally disconnect the auxiliary power path of the charging module 10. In another embodiment, the auxiliary power control signal Ssa may be maintained at the high level at the fifth time point t5 (as shown by a dotted line) without disconnecting the auxiliary power path until a seventh time point t7, that is, the auxiliary power control signal Ssa is changed from the high level to the low level at the seventh time point t7. In practical applications, however, the time point for changing the auxiliary power control signal Ssa from the high level to the low level is not limited at the fifth time point t5 or at the seventh time point t7. In other words, after the main power path is turned on (connected) by the main power control signal Ssm, the system control unit 20 can control the auxiliary power control signal Ssa to be changed from the high level to the low level, and therefore the auxiliary power path is disconnected.

Therefore, the input power source Vin can supply power to the auxiliary power supply unit 12 through the main power path so that the auxiliary power supply unit 12 continuously outputs the auxiliary power Va for supplying the required power to electrical components inside the charging module 10, thereby maintaining the normal operation of the power conversion unit 11 and the charging module control unit 13, or other circuits inside the charging modules 10, such as the energy conversion circuit, feedback circuit, communication circuit, measurement circuit, or so on.

As shown in FIG. 5, the operation of the charging module 10 is described in detail when the input power source Vin is abnormal or interrupted. It is assumed that the input power source Vin fails to supply power at a sixth time point t6. At this condition, the auxiliary power supply unit 12 may be still supply power due to the energy storage of the capacitance energy-storing (energy-charging) effect inside the charging module 10. Until the capacitance energy is completely released at a seventh time point t7, the auxiliary power supply unit 12 fails to output the auxiliary power Va. At this condition, since the charging module control unit 13 fails to be supplied power by the auxiliary power Va, the main power control signal Ssm is changed from the high level to the low level to turn off (disconnect) the main power path.

If the input power source Vin normally supplies power continuously, i.e., the input power source Vin is still at the high level at and after the sixth time point t6. Also refer to FIG. 3, since the elimination of the upstream main switch or the externally-connected switch in the charging power system, the auxiliary path switch Sa can be turned off by the auxiliary power control signal Ssa produced from the system control unit 20, and the main path switch Sm can be turned off by the main power control signal Ssm produced from the charging module control unit 13 when the charging module 10 entering the standby condition (or a sleep condition, an idle condition) is detected. At this condition, the auxiliary power supply unit 12 fails to receive the input power source Vin through the auxiliary power path and the main power path. Accordingly, the auxiliary power supply unit 12 stops outputting the auxiliary power Va to significantly reduce the standby power consumption caused by the auxiliary power Va. Accordingly, the charging module 10 enters the standby condition after the seventh time point t7 as shown in FIG. 5.

Since the auxiliary path switch Sa and the main path switch Sm are turned off to achieve the purpose of reducing the standby power consumption caused by the auxiliary power Va while the charging module 10 enters the standby condition, the auxiliary power control signal Ssa outputted from the system control unit 20 and the main power control signal Ssm outputted form the charging module control unit 13 can be used to respectively turn off the auxiliary path switch Sa and the main path switch Sm to reduce the standby power consumption no matter what the auxiliary path switch Sa is early turned off or the main path switch Sm is early turned off, or the auxiliary path switch Sa and the main path switch Sm are simultaneously turned off. Therefore, the sequence of turning off the auxiliary path switch Sa and the main path switch Sm is not limited to FIG. 5.

Figure 6:
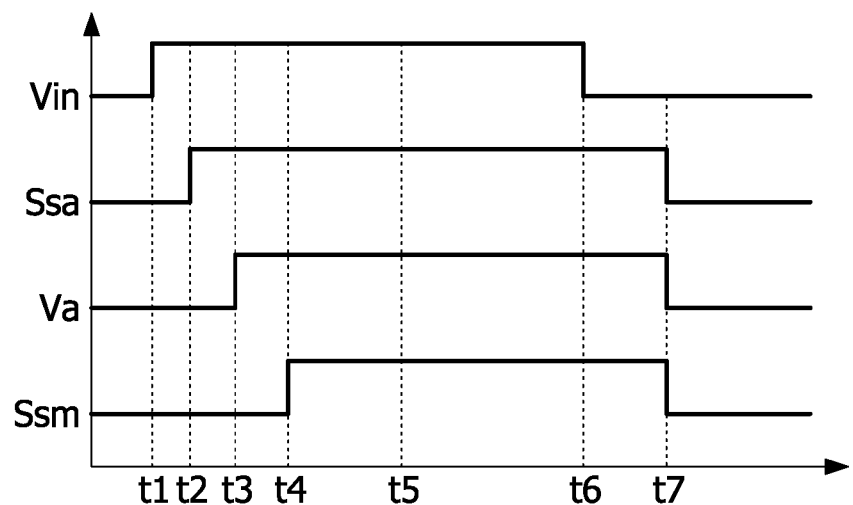
FIG. 6 is a schematic timing diagram of controlling the charging module according to the second embodiment of the present disclosure.

Please refer to FIG. 6, which shows a schematic timing diagram of controlling the charging module according to the second embodiment of the present disclosure. Also, the embodiment shown in FIG. 6 is corresponding to the embodiment shown in FIG. 4. In the embodiment shown in FIG. 4, the auxiliary power control signal Ssa is one of the auxiliary power control signals Ssa1-Ssan outputted from the system control unit 20. The auxiliary power control signal Ssa is changed from the low level to the high level, and the photo coupler receives the auxiliary power control signal Ssa, which is used to turn on (connect) the auxiliary power path and converts the received auxiliary power control signal Ssa into an enable drive signal to control the auxiliary power supply unit 12' to output the auxiliary power Va.

In comparison with FIG. 6 (corresponding to FIG. 4) and FIG. 5 (corresponding to FIG. 3), the detail description of the operations before the fourth time point t4 is omitted here for conciseness since the input power source Vin is activated at the first time point t1, the auxiliary power path is connected at the second time point t2, the auxiliary power Va is established at the third time point t3, and the main power path is connected at the fourth time point t4 which are the same between FIG. 6 and FIG. 5.

In the second embodiment shown in FIG. 4 and FIG. 6, the auxiliary power control signal Ssa produced from the system control unit 20 is continuously maintained at the high level after the fifth time point t5 since no auxiliary path switch Sa is connected in series to the current-limiting resistor R. Therefore, the auxiliary power supply unit 12' is controlled to continuously output the auxiliary power Va to supply power to the charging module control unit 13' so that the charging module control unit 13' can output the main power control signal Ssm to turn on the main power path.

It is assumed that the input power source Vin is abnormal or fails to supply power at the sixth time point t6. At this condition, the auxiliary power supply unit 12' may be still supply power due to the energy storage of the capacitance energy-storing (energy-charging) effect inside the charging module 10'. Until the capacitance energy is completely released at a seventh time point t7, the auxiliary power supply unit 12' fails to output the auxiliary power Va. At this condition, since the charging module control unit 13' fails to be supplied power by the auxiliary power Va, the main power control signal Ssm is changed from the high level to the low level to turn off (disconnect) the main power path.

If the input power source Vin normally supplies power continuously, i.e., the input power source Vin is still at the high level at and after the sixth time point t6 shown in FIG. 6. Also refer to FIG. 4, since the elimination of the upstream main switch or the externally-connected switch in the charging power system, the integrated circuit 121 can be disabled by the auxiliary power control signal Ssa produced from the system control unit 20, and the main path switch Sm can be turned off by the main power control signal Ssm produced from the charging module control unit 13' when the charging module 10 entering the standby condition (or the sleep condition, the idle condition) is detected. At this condition, the auxiliary power supply unit 12' fails to receive the input power source Vin through the main power path and the integrated circuit 121 is directly disabled. Accordingly, the auxiliary power supply unit 12' stops outputting the auxiliary power Va to significantly reduce the standby power consumption caused by the auxiliary power Va. Accordingly, the charging module 10 enters the standby condition after the seventh time point t7 as shown in FIG. 5.

Since the main path switch Sm is turned off and the integrated circuit 121 is disabled to achieve the purpose of reducing the standby power consumption caused by the auxiliary power Va while the charging module 10 enters the standby condition, the auxiliary power control signal Ssa outputted from the system control unit 20 and the main power control signal Ssm outputted form the charging module control unit 13' can be used to disable the integrated circuit 121 and turn off the main path switch Sm to reduce the standby power consumption no matter what the integrated circuit 121 is disabled while turning off the main path switch Sm or after turning off the main path switch Sm. Therefore, the sequence of turning off the main path switch Sm and disabling the integrated circuit 121 is not limited to FIG. 6.

The flexible application of a plurality of charging modules 10 will be described below. For example, it is assumed that the charging power system 100 includes ten charging modules 10, and a rated output current of each charging module 10 is 10 amperes. Also, the electric vehicle needs to be charged at 20 amperes. Therefore, two charging modules 10 are controlled to respectively output the rated output current (10 amperes) to charge the electric vehicle. Since the two charging modules 10 are operated at the full-load condition to output the rated output current, the two charging modules 10 can be maintained at the high efficiency operation. Moreover, the remaining eight charging modules 10 are controlled in the standby condition or the sleep condition. Accordingly, the overall operation efficiency of the charging power system 100 can be optimized.

In contrast, if the upstream main switch or the externally-connected switch is used, the electric vehicle would be simultaneously charged or not charged by the ten charging modules by turning on or turning off the upstream main switch. When the upstream main switch is turned on, the ten charging modules are controlled to respectively output two-ampere current to charge the electric vehicle. At this condition, all the charging modules are not operated at the rated output current (in this example, only operated at 20% of the rated output current), and the overall operation efficiency of the charging power system 100 will be significantly reduced.

In summary, the charging power system 100 may flexibly activate to supply power to the charging module 10 or deactivate to make the charging module 10 be in the standby or sleep condition according to the current demand of charging the electrical vehicle. Accordingly, the operated charging modules 10 provide the high-efficiency rated output current, and the remaining (unnecessary) charging modules 10 are controlled in the standby or sleep condition so as to control the auxiliary power supply unit 12 to stop outputting the auxiliary power Va and make the overall operation efficiency of the charging power system 100 be optimized.

Figure 7:
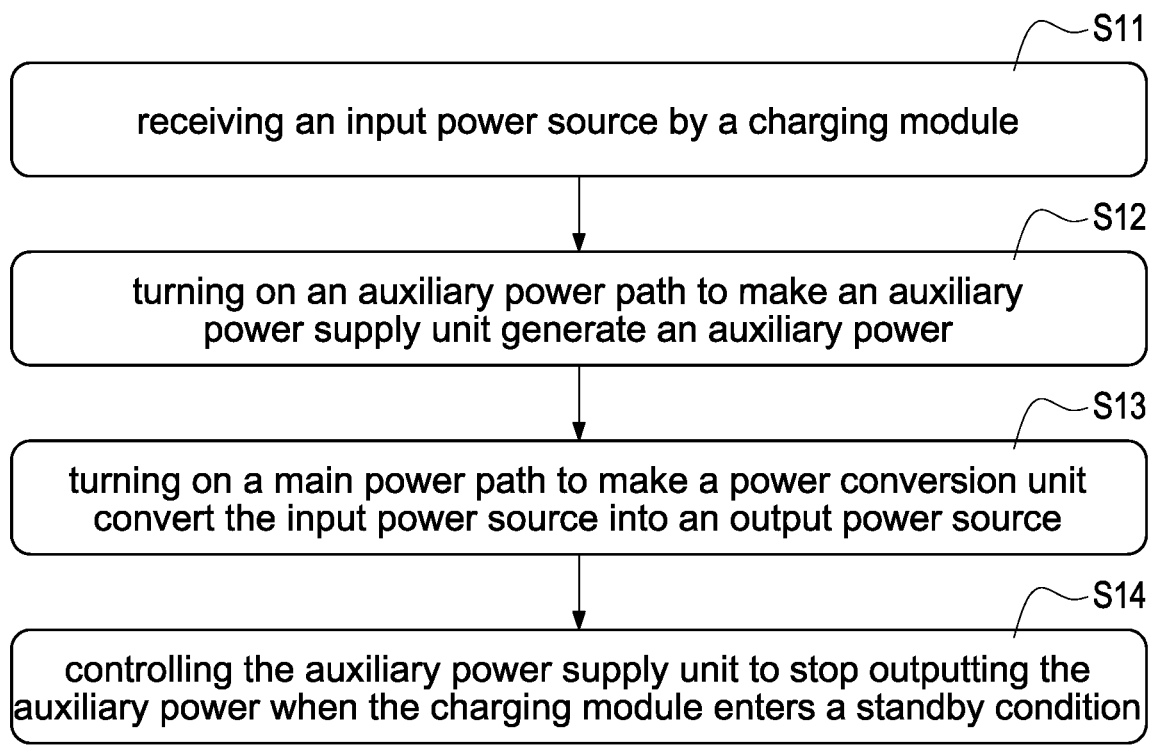
FIG. 7 is a flowchart of a method of controlling the charging power system with low standby power consumption according to the first embodiment of the present disclosure.

Please refer to FIG. 7, which shows a flowchart of a method of controlling the charging power system with low standby power consumption according to the first embodiment of the present disclosure. The first embodiment is corresponding to the embodiment shown in FIG. 5, and detailed description thereof may be combined with reference to FIG. 5 and its corresponding context. The control method includes steps as follows. First, a plurality of charging modules of the charging power system receives an input power source (S11), and the input power source may be a DC input power source or an AC input power source. The step (S11) is corresponding to the first time point t1 shown in FIG. 5. Afterward, an auxiliary power path of the charging module is turned on (connected) to activate an auxiliary power supply unit of the charging module to output an auxiliary power (S12). The step (S12) is corresponding to the second time point t2 and the third time point t3 shown in FIG. 5.

Afterward, a main power path of the charging module is turned on (connected) to activate a power conversion unit of the charging module to convert the input power source into an output power source to provide a charging power (S13). The step (S13) is corresponding to the fourth time point t4 shown in FIG. 5. Afterward, when the charging module entering a standby condition, the auxiliary power supply unit is disabled to stop outputting the auxiliary power (S14). The step (S14) is corresponding to the seventh time point t7 shown in FIG. 5 or FIG. 6. Accordingly, the auxiliary power supply unit stops outputting the auxiliary power to significantly reduce the standby power consumption caused by the auxiliary power after the charging module enters the standby condition.

In conclusion, the present disclosure has following features and advantages:

1. The current-limiting resistor with the high resistance is used to suppress the large instantaneous inrush current since the auxiliary path switch is instantaneously turned on.

2. The charging module is controlled to enter the standby condition to disconnect the auxiliary power by disconnecting the main power path and disconnect the auxiliary power path or disable the integrated circuit which is part of the auxiliary power supply unit, thereby significantly reducing the standby power consumption caused by the auxiliary power and increasing overall efficiency of the charging power system.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A charging power system with low standby power consumption, comprising:
   a system control unit configured to produce at least one auxiliary power control signal; and
   a plurality of charging modules connected in parallel to each other, and configured to receive an input power source, each charging module comprising:
   an auxiliary power supply unit connected to the input power source through an auxiliary power path, and configured to produce an auxiliary power for supplying the required power to electrical components inside the charging module;
   a power conversion unit connected to the input power source through a main power path, and configured to receive the auxiliary power; and
   a charging module control unit connected to the auxiliary power supply unit, and configured to receive the auxiliary power and produce a main power control signal;
   wherein the auxiliary power path has a current-limiting resistor and the main power path has a main path switch;
   wherein the main path switch is connected between the input power source and an input side of the power conversion unit, and the current-limiting resistor is connected between the input power source and an input side of the auxiliary power supply unit; and
   wherein when the charging module enters a standby condition, the main power control signal is configured to turn off the main path switch and the auxiliary power control signal is configured to disable the auxiliary power supply unit so as to stop outputting the auxiliary power.

2. The charging power system with low standby power consumption in claim 1, wherein the auxiliary power path provides an auxiliary path switch;
   wherein the auxiliary path switch is configured to receive the auxiliary power control signal to make the auxiliary power supply unit output the auxiliary power; the main path switch is configured to receive the main power control signal to make the power conversion unit convert the input power source into an output power source.

3. The charging power system with low standby power consumption in claim 2, wherein when the charging module enters the standby condition, the auxiliary power control signal is configured to turn off the auxiliary path switch to disconnect the auxiliary power path, and the main power control signal is configured to turn off the main path switch to disconnect the main power path so that the auxiliary power supply unit is configured to stop outputting the auxiliary power.

4. The charging power system with low standby power consumption in claim 1, wherein the auxiliary power supply unit further comprises:
   an integrated circuit configured to receive the auxiliary power control signal to control the auxiliary power supply unit to output the auxiliary power by the auxiliary power control signal;
   wherein the main path switch is configured to receive the main power control signal to make the power conversion unit be configured to convert the input power source into an output power source.

5. The charging power system with low standby power consumption in claim 4, wherein when the charging module enters the standby condition, the auxiliary power control signal is configured to disable the integrated circuit, and the main power control signal is configured to turn off the main path switch to disconnect the main power path so that the auxiliary power supply unit is configured to stop outputting the auxiliary power.

6. The charging power system with low standby power consumption in claim 2, wherein the current-limiting resistor is connected in series to the auxiliary path switch.

7. The charging power system with low standby power consumption in claim 2, wherein the main path switch and the auxiliary path switch are relays or semiconductor power switches.

8. The charging power system with low standby power consumption in claim 4, wherein the main path switch is a relay or a semiconductor power switch.

9. A method of controlling a charging power system with low standby power consumption, the charging power system comprising a plurality of charging modules, and each charging module comprising a power conversion unit, an auxiliary power supply unit, and a charging module control unit, the method comprising steps of:
(a) receiving an input power source by each charging module;
(b) turning on an auxiliary power path of each charging module to make the auxiliary power supply unit generate an auxiliary power for supplying the required power to electrical components inside the charging module to supply power to the charging module control unit and the power conversion unit; wherein the auxiliary power path provides a current-limiting resistor, and the current-limiting resistor is connected between the input power source and an input side of the auxiliary power supply unit;
(c) turning on a main power path, which has a main path switch, of each charging module to make the power conversion unit convert the input power source into an output power source; wherein the main path switch is connected between the input power source and an input side of the power conversion unit; and
(d) turning off the main path switch and disabling the auxiliary power supply unit to stop outputting the auxiliary power when the charging module enters a standby condition in which no electric vehicle is charged.

10. The method of controlling the charging power system with low standby power consumption in claim 9, wherein the auxiliary power path provides an auxiliary path switch;
wherein the auxiliary path switch is configured to receive an auxiliary power control signal to make the auxiliary power supply unit output the auxiliary power; the main path switch is configured to receive a main power control signal to make the power conversion unit convert the input power source into the output power source.

11. The method of controlling the charging power system with low standby power consumption in claim 10, wherein when the charging module enters the standby condition, the auxiliary power control signal is configured to turn off the auxiliary path switch to disconnect the auxiliary power path, and the main power control signal is configured to turn off the main path switch to disconnect the main power path so that the auxiliary power supply unit is configured to stop outputting the auxiliary power.

12. The method of controlling the charging power system with low standby power consumption in claim 9, wherein each auxiliary power supply unit further comprises:
an integrated circuit configured to receive an auxiliary power control signal to control the auxiliary power supply unit to output the auxiliary power by the auxiliary power control signal;
wherein the main path switch is configured to receive a main power control signal to make the power conversion unit be configured to convert the input power source into an output power source.

13. The method of controlling the charging power system with low standby power consumption in claim 12, wherein when the charging module enters the standby condition, the auxiliary power control signal is configured to disable the integrated circuit, and the main power control signal is configured to turn off the main path switch to disconnect the main power path so that the auxiliary power supply unit is configured to stop outputting the auxiliary power.

14. The method of controlling the charging power system with low standby power consumption in claim 10, wherein the current-limiting resistor is connected in series to the auxiliary path switch.

15. The method of controlling the charging power system with low standby power consumption in claim 10, wherein the main path switch and the auxiliary path switch are relays or semiconductor power switches.

16. The method of controlling the charging power system with low standby power consumption in claim 12, wherein the main path switch is a relay or a semiconductor power switch.

17. The method of controlling the charging power system with low standby power consumption in claim 10, wherein the charging power system further comprises a system control unit; the system control unit is configured to produce the auxiliary power control signal, and the charging module control unit is configured to produce the main power control signal.

18. The method of controlling the charging power system with low standby power consumption in claim 12, wherein the charging power system further comprises a system control unit; the system control unit is configured to produce the auxiliary power control signal, and the charging module control unit is configured to produce the main power control signal.

* * * * *